United States Patent
Kim et al.

(10) Patent No.: US 11,904,266 B2
(45) Date of Patent: Feb. 20, 2024

(54) FILTER ASSEMBLY AND AIR CONDITIONING APPARATUS HAVING THE SAME

(71) Applicant: SAMSUNG ELECTRONICS CO., LTD., Suwon-si (KR)

(72) Inventors: Donghyun Kim, Suwon-si (KR); Hyunah Kim, Suwon-si (KR); Kwangnam Shin, Suwon-si (KR); Jeongkyo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 398 days.

(21) Appl. No.: 17/130,644

(22) Filed: Dec. 22, 2020

(65) Prior Publication Data
US 2021/0187424 A1 Jun. 24, 2021

(30) Foreign Application Priority Data

Dec. 23, 2019 (KR) .......................... 10-2019-0173337

(51) Int. Cl.
*B01D 46/00* (2022.01)
*B01D 46/10* (2006.01)
*F24F 13/28* (2006.01)

(52) U.S. Cl.
CPC ......... *B01D 46/0005* (2013.01); *B01D 46/10* (2013.01); *F24F 13/28* (2013.01)

(58) Field of Classification Search
CPC ..... B01D 46/0005; B01D 46/10; F24F 13/28; F24F 8/108
USPC .......................................................... 55/495
See application file for complete search history.

(56) References Cited

U.S. PATENT DOCUMENTS

| 6,508,851 | B2 | 1/2003 | Goerg |
| 8,187,355 | B2 | 5/2012 | Kim et al. |
| 2009/0188223 | A1 | 7/2009 | Pippel |
| 2010/0126129 | A1* | 5/2010 | Kim ........................ A47L 9/122 55/494 |

(Continued)

FOREIGN PATENT DOCUMENTS

| CN | 105890063 A | * | 8/2016 | ............... A61L 9/20 |
| JP | 2003-314873 A | | 11/2003 | |

(Continued)

OTHER PUBLICATIONS

International Search Report dated Apr. 8, 2021 from International Application No. PCT/KR2020/018812.

(Continued)

*Primary Examiner* — Robert A Hopkins
*Assistant Examiner* — Qianping He
(74) *Attorney, Agent, or Firm* — STAAS & HALSEY LLP

(57) ABSTRACT

An air conditioning apparatus is disclosed. The air conditioning apparatus includes a filter, a fan configured to generate an air flow, a case configured to accommodate the filter and the fan within, and including a support member supporting the filter, and a sealing member covering a gap between the case and the filter, and the filter includes a side-surface member formed along a side-surface, and at least one from among the support member and the side-surface member is formed with a groove which transfers pressure of an upstream side of the filter to the sealing member based on the fan operating.

11 Claims, 9 Drawing Sheets

(56) References Cited

U.S. PATENT DOCUMENTS

| | | | |
|---|---|---|---|
| 2010/0282083 A1* | 11/2010 | Edwards | ............... B03C 3/155 55/482 |
| 2016/0236126 A1 | 8/2016 | Law et al. | |
| 2019/0105458 A1 | 4/2019 | Hammes et al. | |

FOREIGN PATENT DOCUMENTS

| | | |
|---|---|---|
| JP | 2015-131269 A | 7/2015 |
| JP | 2015131269 A * | 7/2015 |
| JP | 2016-52645 | 4/2016 |
| JP | 6208583 B2 | 10/2017 |
| KR | 10-2001-0052364 A | 6/2001 |
| KR | 10-2011-0012681 | 2/2011 |
| KR | 10-2015-0060123 A | 6/2015 |
| KR | 10-1549440 B1 | 9/2015 |
| KR | 10-2016-0055278 | 5/2016 |
| RU | 193890 U1 * | 11/2019 |

OTHER PUBLICATIONS

Written Opinion of the International Searching Authority dated Apr. 8, 2021 from International Application No. PCT/KR2020/018812.

\* cited by examiner

FILTER ASSEMBLY AND AIR CONDITIONING APPARATUS HAVING THE SAME

CROSS-REFERENCE TO RELATED APPLICATION

This application is based on and claims priority under 35 U.S.C. § 119 to Korean Patent Application No. 10-2019-0173337, filed on Dec. 23, 2019, in the Korean Intellectual Property Office, the disclosure of which is incorporated by reference herein in its entirety.

BACKGROUND

1. Field

The disclosure relates to a filter assembly and an air conditioning apparatus having the same. More particularly, the disclosure relates to a filter assembly which prevents air leakage through a gap between the filter assembly and a case which is coupled with the filter assembly and an air conditioning apparatus having the same.

2. Description of Related Art

Even if a dust collecting efficiency of a filter is superior, if air which does not pass through the filter is leaked, the overall efficiency of an air conditioning apparatus may be decreased. Accordingly, recently attempts to reduce the gap through which air is leaked or raise the overall efficiency of the air conditioning apparatus by comprising the gap in multi-levels are continuously made.

However, despite attempts to control the gap through which air is leaked, there is the difficulty to replacing a filter due to the gap with a complex structure, and because the gap is changed by the pressure asserted by air flow, there is also the difficulty in leakage increasing.

SUMMARY

According to an embodiment, an air conditioning apparatus includes a filter, a fan configured to generate air flow, a case configured to accommodate the filter and the fan within and includes a support member supporting the filter, and a sealing member covering a gap between the case and the filter, and the filter includes a side-surface member formed along a side-surface, and at least one from among the support member and the side-surface member may be formed with a groove which transfers an upstream pressure of the filter to the sealing member when the fan is operated.

The filter is changeably mounted to the support member.

A one-end of the sealing member is fixed to the filter or the case.

The groove is formed in plurality spaced apart at a predetermined interval.

The filter is an ultra-low penetration air (ULPA) filter.

The side-surface member is disposed vertically spaced apart with the support member and the sealing member is disposed between the support member and the side-surface member.

The side-surface member is disposed more to an upstream side than the support member and a one-end of the sealing member is fixed to the filter.

The side-surface member is disposed more to a downstream side than the support member and a one-end of the sealing member is fixed to the case.

The side-surface member is disposed horizontally spaced apart with the support member and the air conditioning apparatus further comprises an auxiliary frame which is disposed vertically spaced apart with the support member and the side-surface member and the sealing member comprises at least one from among a first sealing member disposed between the support member and the auxiliary frame and a second sealing member disposed between the side-surface member and the auxiliary frame.

A one-end of the first sealing member is fixed to the case and a one-end of the second sealing member is fixed to the filter.

The auxiliary frame is fixed to be detachable with the support member or the side-surface member.

According to an embodiment, a filter assembly comprises a filter, a frame supporting the filter, a side-surface member protrudingly formed along a side-surface of the frame and a sealing member disposed at a one-surface of the side-surface member, and the side-surface member is formed with a plurality of holes to an other surface.

The plurality of holes may be formed in plurality spaced apart at a predetermined interval on the other surface of the side-surface member.

A one-end of the sealing member is fixed to the frame.

The filter is an ultra-low penetration air (ULPA) filter.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The example embodiments described herein are provided to assist in the understanding of the disclosure, and it is to be understood that the disclosure is not limited to the embodiments disclosed below, and that the embodiments may be implemented to various forms and various modifications may be applied thereto. However, in describing the disclosure below, if it is determined that the detailed description on a related known function or element unnecessarily obscures the gist of the disclosure, the detailed description and illustration thereof may be omitted. In addition, the accompanied drawings are not illustrated in the actual scale to assist in the understanding of the disclosure, but are illustrated so that the dimensions of some elements are exaggerated.

The terms used in the disclosure and the claims are general terms identified in consideration of the functions of the various embodiments. However, these terms may vary depending on intention, legal or technical interpretation, emergence of new technologies, and the like of those skilled in the related art. In addition, some arbitrary terms may be used. The terms may be interpreted to a meaning defined in the disclosure, and unless otherwise specified, the terms may be understood based on the overall contents and technological common sense of those skilled in the related art.

It is to be understood that the expressions such as "comprise," "may comprise," "include," or "may include" are used herein to designate a presence of a corresponding characteristic (e.g., an element such as a number, a function, an operation, or a component), and not to preclude a presence or a possibility of additional characteristics.

Further, because elements necessary in describing each embodiment are described herein, the embodiments are not necessarily limited thereto. Accordingly, some elements may be modified or omitted, and other elements may be included. In addition, the elements may be disposed broken up in apparatuses independent from one another.

Furthermore, although the accompanied drawings and embodiments have been described in detail with reference to the descriptions disclosed in the accompanied drawings, it is to be understood that the disclosure is not limited by the embodiments.

The disclosure will be described in greater detail below with reference to the accompanying drawings.

The disclosure provides a filter assembly which prevents air leakage through a gap between the filter assembly and a case coupled with the filter assembly and an air conditioning apparatus having the same.

Figure 1:
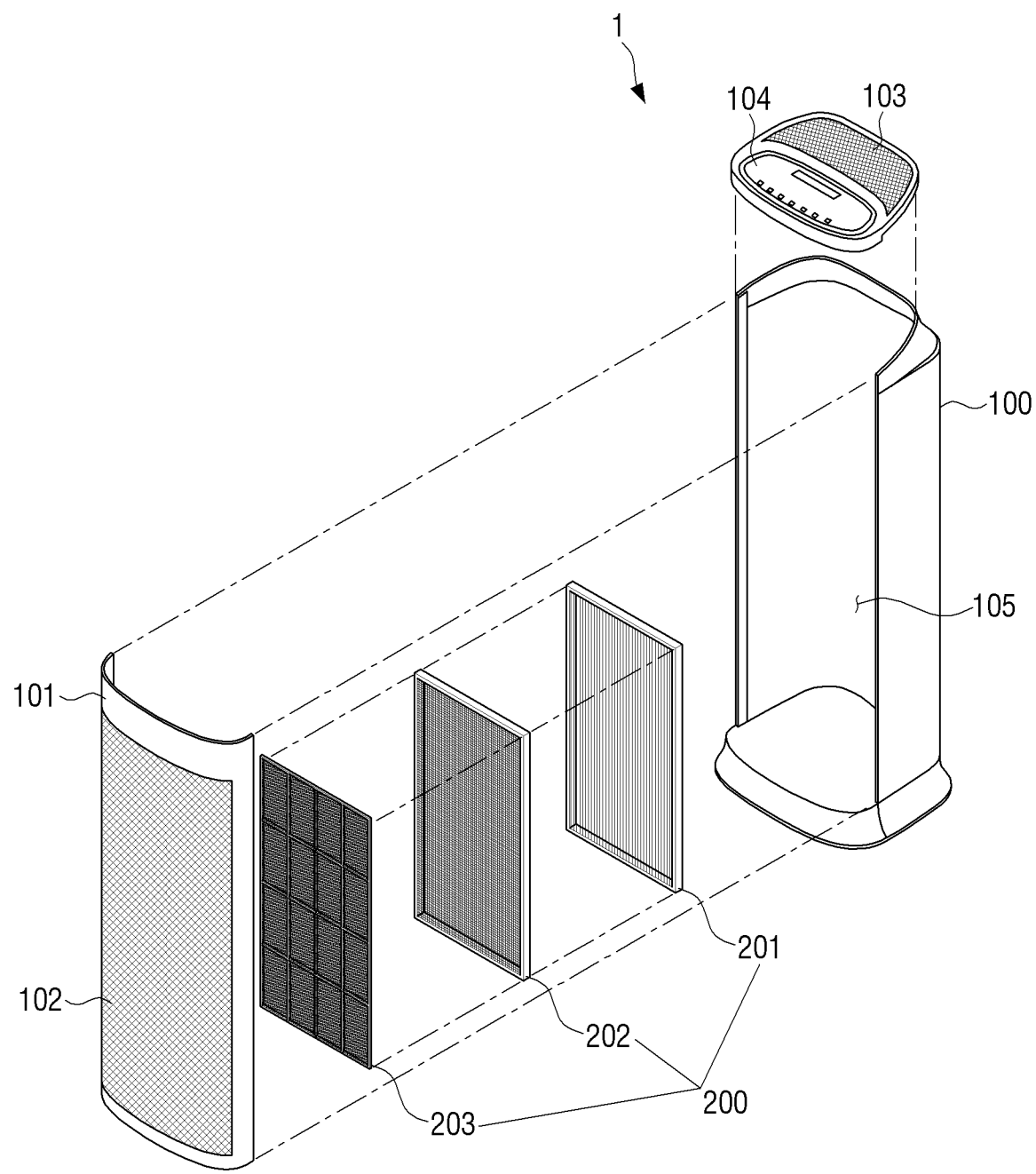
FIG. 1 is an exploded perspective view illustrating an air conditioning apparatus according to an embodiment.

FIG. 1 is an exploded perspective view illustrating an air conditioning apparatus 1 according to an embodiment.

The air conditioner 10 may, as an apparatus necessary for achieving the object of conditioning air, perform at least one from among a cooling function, a heating function, a humidifying function, a dehumidifying function, a purifying function of air, and types thereof may include an air purifier, an air conditioner, a humidifier, a vacuum cleaner, or the like.

Referring to FIG. 1, the air conditioning apparatus 1 according to an embodiment may include a case 100 configured to have a fan (not shown) within which forcibly suctions outside air and generates an air flow, and a at least one filter 200 disposed within the case 100.

The case 100 may have a front cover 101 which is detachably coupled to the front of the case 100. The front cover 101 may be formed with a plurality of small air inlets 102.

The case 100 may form an exterior of the air conditioning apparatus 1, and accommodate at least one filter 200 and a fan (not shown) within. A user may separate the front cover 101 from the case, and easily exchange the filter accommodated within.

The case 100 may forcibly suction air outside the case 100 into the case 100 through the plurality of air inlets 102 in the front cover 101 based on the fan operating. At this time, dust and other pollutants included in the outside air may be filtered passing through the at least one filter 200.

The fan may be disposed at an upstream side of the filter 200, and the dust and other pollutants which may generate based on the fan operating may be filtered by the filter 200 accordingly. However, the disposition of the fan is not limited thereto, and may be disposed at a downstream side of the filter 200.

The case 100 may be formed with an air outlet 103 for discharging air purified through the filter 200 to the outside of the case 100 at the upper part of the case 100. However, the air outlet 103 is not limited to the upper part of the case 100 and may be formed at a side-surface or a back-surface of the case 100.

The case 100 may include an operation panel 104 for the user input so as to perform an on/off function and various functions of the air conditioning apparatus 1. The operation panel 104 may be disposed at the upper part of the case 100 for an easy access by the user, but the embodiment is not limited thereto, and may be disposed at the side-surface or the back-surface of the case 100. The operation panel 104 may be implemented in a touch screen for the user input in addition to displaying an operating state.

The filter 200 may be comprised of a high-performance filter 201, a filter saver 202, and a free filter 203, but the type and number of filters 200 is not limited thereto. The high-performance filter 201, the filter saver 202, and the free filter 203 may be disposed in order from the accommodating space 105 toward the side of the front cover 101.

The free filter 203 may be formed of a nonwoven material, or formed in a shape of a metal film or a metal net in which a mesh of the filter is quite finely punctured. The filter saver 202 may have an electric dust collecting structure capable of collecting dust through charging. The high-performance filter 201 may be a high-efficiency particulate air (HEPA) filter or an ultra-low penetration air (ULPA) filter.

The air conditioning apparatus 1 may more effectively perform filtering of outside air through a plurality of filters 200 configured in multi-layers. In addition, as to be described below, the gap between the filter 200 and the case 100 may be blocked and air which does not pass through the filter may be prevented from leaking. The detailed configuration and function of the filter and the case with respect to the above will be described below.

Figure 2:
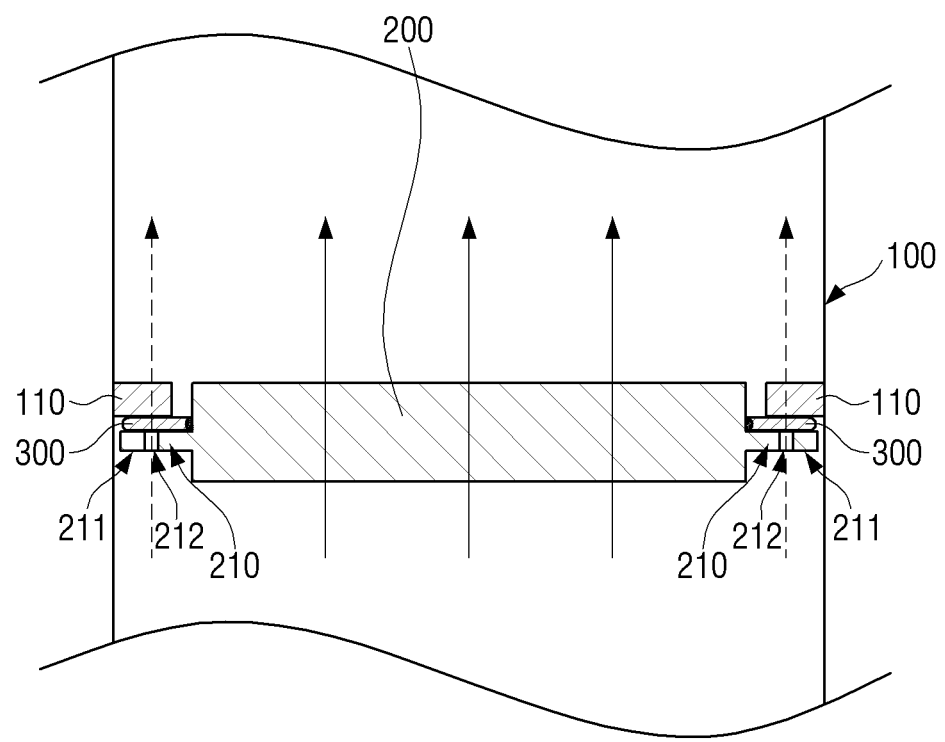
FIG. 2 is a cross-sectional view illustrating a schematic figure of an air flow of an air conditioning apparatus according to an embodiment.
Figure 3:
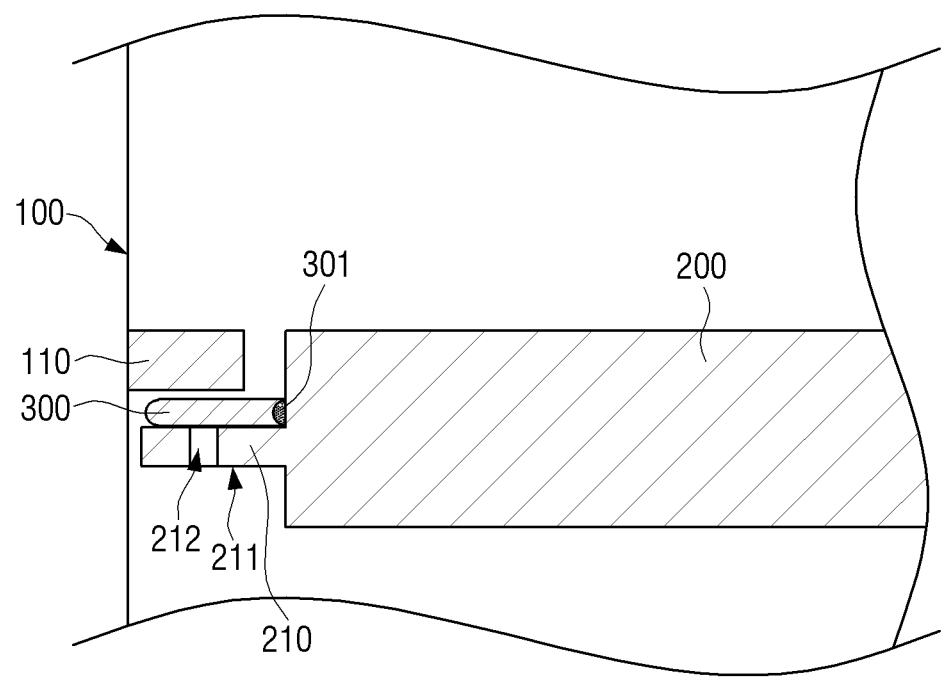
FIG. 3 is a partial cross-sectional view illustrating an exploded configuration between a case and a filter in FIG. 2.
Figure 4:
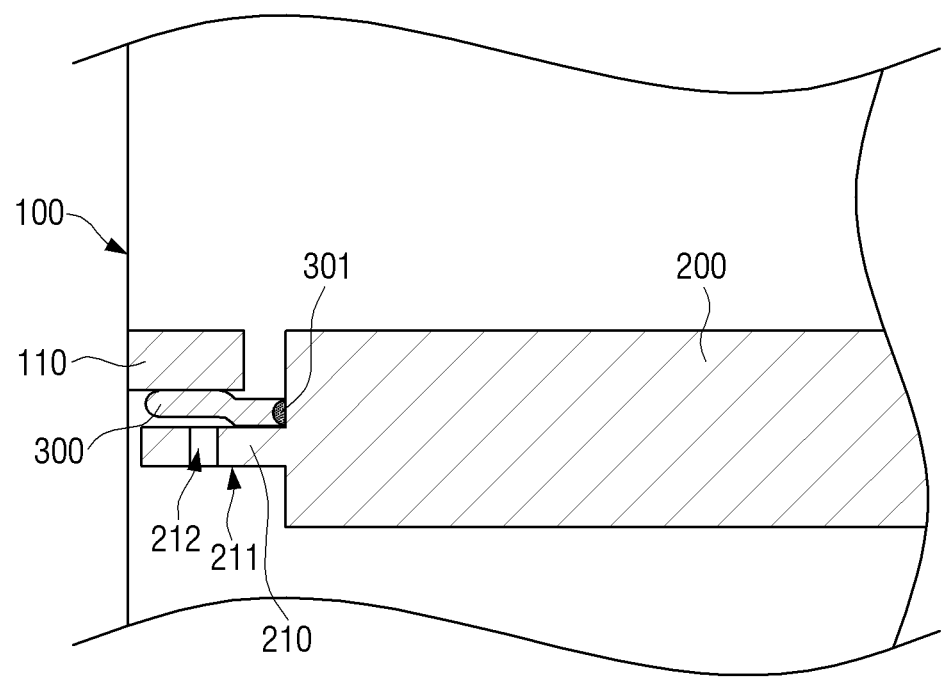
FIG. 4 is a partial cross-sectional view illustrating a figure of a form of a sealing member changing when a fan is operated.

FIG. 2 is a cross-sectional view illustrating a schematic figure of an air flow of an air conditioning apparatus 1 according to an embodiment. FIG. 3 is a partial cross-sectional view illustrating an exploded configuration between a case 100 and a filter 200 in FIG. 2. FIG. 4 is a partial cross-sectional view illustrating a figure of a form of a sealing member changing when a fan is operated.

Referring to FIG. 2, a flow direction of air generated by a fan has been schematically illustrated. Specifically, the solid line from among the arrows illustrated in FIG. 2 may represent the flow direction of air moving toward the filter 200, and the dotted line may represent the flow direction of air moving toward the gap between the filter 200 and the case 100.

The sealing member 300 may cover the gap between the case 100 and the filter 200 and prevent air which has not passed through the filter 200 from being leaked to a downstream side of the filter 200. The specific operation and configuration of the sealing member 300 may be described in detail below with reference to FIGS. 3 and 4.

Referring to FIGS. 3 to 4, the case 100 may include a support member 110 which supports the filter 200.

The support member 110 has been illustrated in a protruding form toward the filter 200, but this is for convenience of description, and the form of the support member 110 is not limited thereto. Specifically, the support member 110 may be a portion of an inner frame which is formed corresponding to a cross-section of the filter 200, and there is no limitation to the form so long as it is in a form capable of supporting the filter 200.

The filter 200 may be changeably mounted to the support member 110. In addition, an outer circumference the filter 200 may be supported in a shape which is inserted into an inner circumference of the support member 110, but the embodiment is not limited thereto. The above-described filter 200 may be any one from among the high-performance filter 201, the filter saver 202, or the free filter 203.

Based on a plurality of filters 200 being provided within the air conditioning apparatus 1, a leak prevention structure as to be described below may be applied to each of the plurality of filters 200, and may also be applied to the any one filter (e.g., high-performance filter) only.

A flow pressure of air generated by the fan may be applied to a front-surface of the upstream side of the filter 200, and a relatively low pressure such as atmospheric pressure may be applied to the back of the downstream side of the filter 200. Accordingly, a difference in pressure may be generated to the front-surface and back-surface of the filter 200.

The filter 200 may include a side-surface member 210 which is formed along the side-surface. The side-surface member 210 may be disposed more vertically spaced apart than the support member 110 to the upstream side.

Based on the support member 110 and the side-surface member 210 being disposed as described above, the user may easily attach and detach the filter 200 toward the upstream direction.

The side-surface member 210 has been illustrated to a form protruding from the side-surface of the filter 200 toward the case 100, but the form of the side-surface member 210 is not limited thereto. Specifically, the side-surface member 210 may be formed by an edge of the front-surface or the back-surface of the filter 200 being extended, and there is no limitation to the form so long as it is capable of supporting the sealing member 300.

As illustrated above, due to the support member 110 and the side-surface member 210 which are disposed vertically spaced apart from each other, a length of the gap between the case 100 and the filter 200 may be lengthened, and because the form may become more complex, the air leakage may be more effectively prevented.

The sealing member 300 may be disposed in-between the gap which the support member 110 and the side-surface member 210 are vertically spaced apart, and may cover the gap between the case 100 and the filter 200.

The side-surface member 210 may be formed with a groove 212 which penetrates toward a thickness direction of a one-surface 211. Through the groove 212 which is formed on the one-surface 211 of the side-surface member 210, the pressure of the upstream side of the filter 200 may be transferred to the sealing member 300 disposed to an other-surface of the side-surface member 210.

That is, the flow pressure of air may be transferred to the front-surface of the sealing member 300, and a relatively low pressure of the downstream side of the filter 200 may be transferred to the back-surface. Accordingly, a difference in pressure may be generated to the front-surface and back-surface of the sealing member 300.

Because the front-surface of the sealing member 300 may receive a relatively higher pressure than the back-surface, the form of the sealing member 300 may be changed to a shape which is more closely in contact with the support member 110.

Based on the form of the sealing member 300 changing, because the gap between the case 100 and the filter 200 becomes narrow or completely blocked, the possibility of air leaking may become even lower.

That is, the sealing member 300 may use the pressure difference in the front-surface and back surface of the filter 200 to actively block air from leaking through the gap between the case and the filter 200.

Although not illustrated, the inside of the support member 110 may be formed with a hole for the back-surface and the side-surface of the support member 110 to be connected. The pressure of the downstream side of the filter 200 may be transferred to the back-surface of the sealing member 300 through the hole of the above-described support member 110 and gap between the support member 110 and the filter 200.

That is, because the difference in pressure that the front-surface and the back-surface of the sealing member 300 are to receive may become greater, the form of the sealing member 300 may be changed to be more closely in contact with the support member 110. Accordingly, the sealing member 300 may more effectively block air leaking through the gap between the case 100 and the filter 200.

The one-end 301 of the sealing member 300 may be fixed to the filter 200. Specifically, the one-end 301 of the sealing member 300 is formed on the filter 200, and may be fixed in a insertable method to the recess (not shown). However, the embodiment is not limited thereto, and the one-end 301 of the sealing member 300 may be fixed to the filter 200 in various methods such as a method of being adhered to the filter 200, or the like.

Accordingly, even if the form of the sealing member 300 is changed by the air flow pressure, because the one-end 301 of the sealing member 300 is not removed from the fixed position, the sealing member 300 may stably prevent air leakage.

The sealing member 300 may be formed in a plate form capable of easily receiving pressure, but is not necessarily limited thereto.

The sealing member 300 may be formed in a flexible rubber material for change by pressure to be made easily, but is not necessarily limited thereto.

In particular, based on the type of filter being a high-performance filter with high pressure loss such as a HEPA filter, if the structure of the above-described sealing member 300 is applied, the difference in pressure of both ends of the sealing member may become greater and thus, the effect of blocking air from leaking may be increased.

Figure 5:
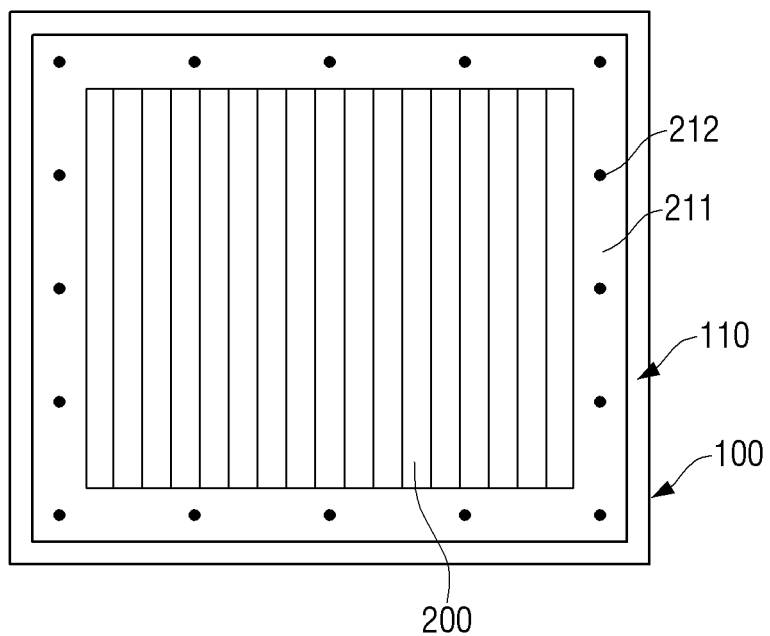
FIG. 5 is a front view illustrating a configuration of FIG. 3 seen from an upstream side of an air flow direction.

FIG. 5 is a front view illustrating a configuration of FIG. 3 seen from an upstream side of an air flow direction. Referring to FIG. 5, the filter 200, the side-surface member 210, and the support member 110 may be disposed in order from the center of the air flow-path toward the outside.

The groove 212 may be formed in plurality spaced apart at a predetermined interval on the one-surface 211 of the side-surface member 210. Accordingly, the pressure of the upstream side of the filter 200 may be uniformly transferred to the front-surface of the sealing member 300.

Because pressure of the upstream side of the filter 200 is equally transferred to the front surface of the sealing member 300 through the groove 212 formed at a predetermined interval, the air may be prevented from leaking due to a gap opening in any localized region of the sealing member 300.

The cross-sectional forms of the filter 200 and the case 100 have been illustrated as a quadrangle, but the form may be circular, and there is no limitation to the form thereof.

Figure 6:
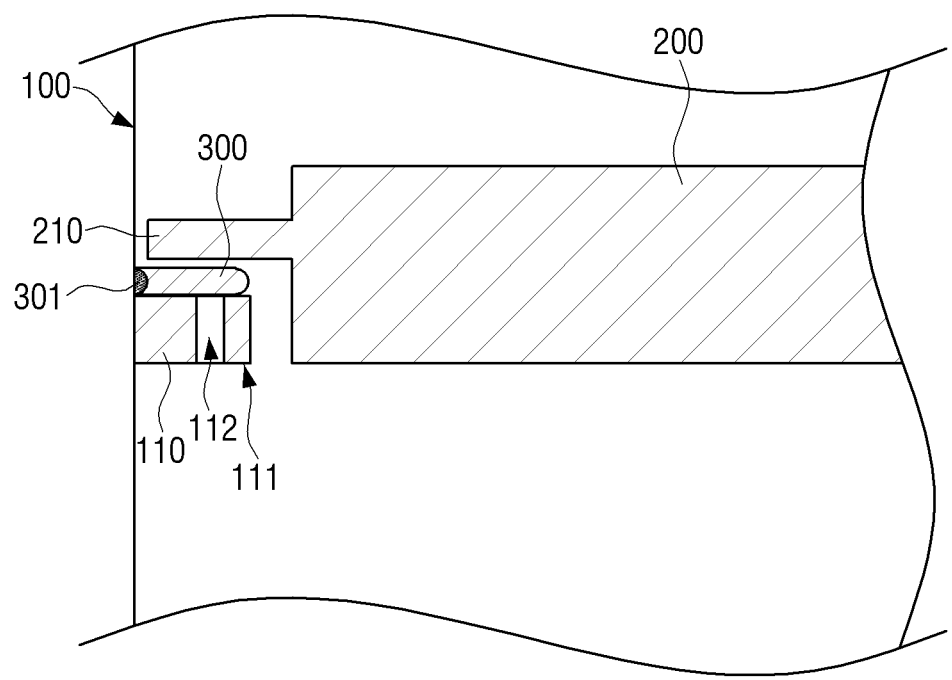
FIG. 6 is a partial cross-sectional view illustrating a side-surface member being disposed more to a downstream side of an air flow direction than a support member according to an embodiment.

FIG. 6 is a partial cross-sectional view illustrating a side-surface member 210 being disposed more to a downstream side of an air flow direction than a support member 110 according to an embodiment.

Referring to FIG. 6, the configuration of the support member 110, the side-surface member 210, and the sealing member 300 according to an embodiment will be described, and like reference numerals will be provided with respect to configurations which are identical with the above-described embodiments and redundant descriptions may be omitted.

Referring to FIG. 6, unlike the above-described embodiment, the side-surface member 210 may be more vertically spaced apart than the support member 110 and disposed at the downstream side. Based on the arrangement of the support member 110 and the side-surface member 210 as described above, the user may easily attach and detach the filter 200 to a downstream direction (outside).

As illustrated above, due to the support member 110 and the side-surface member 210 which are disposed vertically spaced apart from each other, the length of the gap between the case 100 and the filter 200 may be lengthened, and because the form may become more complex, the air leakage may be more effectively prevented.

The support member 110 may be formed with a groove 112 which penetrates in a thickness direction to the one-surface 111. Through the groove 112 formed on the one-surface 111 of the support member 110, the pressure of the upstream side of the filter 200 may be transferred to the sealing member 300 disposed at the other-surface of the support member 110.

Accordingly, because the front-surface of the sealing member 300 may receive a relatively higher pressure than the back-surface, the form of the sealing member 300 may be changed to a shape which is more closely in contact with the side-surface member 210.

Based on the changed form of the sealing member 300, because the gap between the case 100 and the filter 200 is narrowed or completely blocked, the air leaked through the gap between the case 100 and the filter 200 may be actively and effectively blocked.

Although not illustrated, the side-surface member 210 may be formed with a hole within for the back-surface and the side-surface of the side-surface member 210 to be connected. The pressure of the downstream side of the filter 200 may be transferred to the back-surface of the sealing member 300 through the hole of the above-described side-surface member 210 and the gap between the side-surface member 210 and the filter 200.

That is, because the difference in pressure received by the front-surface and the back-surface of the sealing member 300 becomes greater, the form of the sealing member 300 may be changed to be closely in contact with the side-surface member 210. Accordingly, the sealing member 300 may more effectively block air leaking through the gap between the case 100 and the filter 200.

Figure 7:
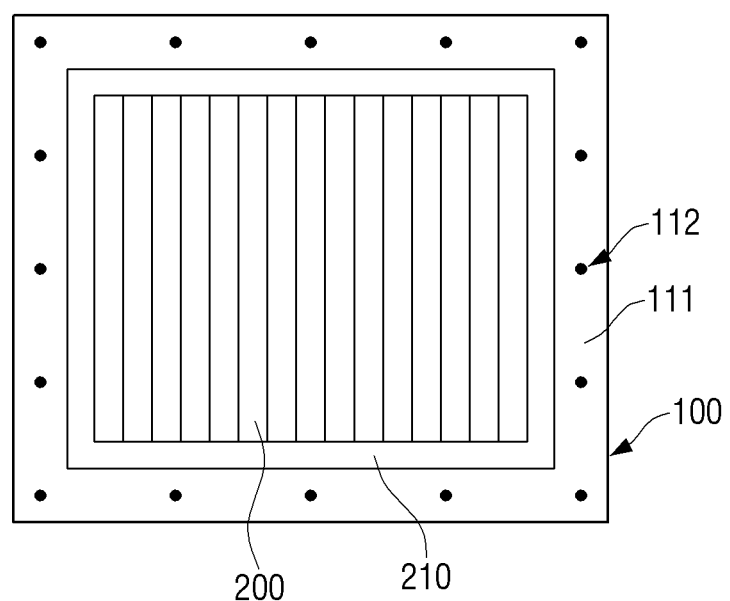
FIG. 7 is a front view of a configuration of FIG. 6 seen from an upstream side of an air flow direction.

FIG. 7 is a front view of a configuration of FIG. 6 seen from an upstream side of an air flow direction. Referring to FIG. 7, the filter 200, the side-surface member 210, and the support member 110 may be disposed in order from the center of the air flow-path toward the outside.

The groove 112 may be formed in plurality spaced apart at a predetermined interval on the one-surface 111 of the support member 110. Accordingly, the pressure of the upstream side of the filter 200 may be uniformly transferred to the front-surface of the sealing member 300.

Because the pressure of the upstream side of the filter 200 is equally transferred to the front surface of the sealing member 300 through the groove 112 formed at the predetermined interval, the air may be prevented from leaking due to a gap opening in any localized region of the sealing member 300.

As described above, the cross-sectional forms of the filter 200 and the case 100 have been illustrated as a quadrangle, but the form may be circular, and there is no limitation to the form thereof.

Figure 8:
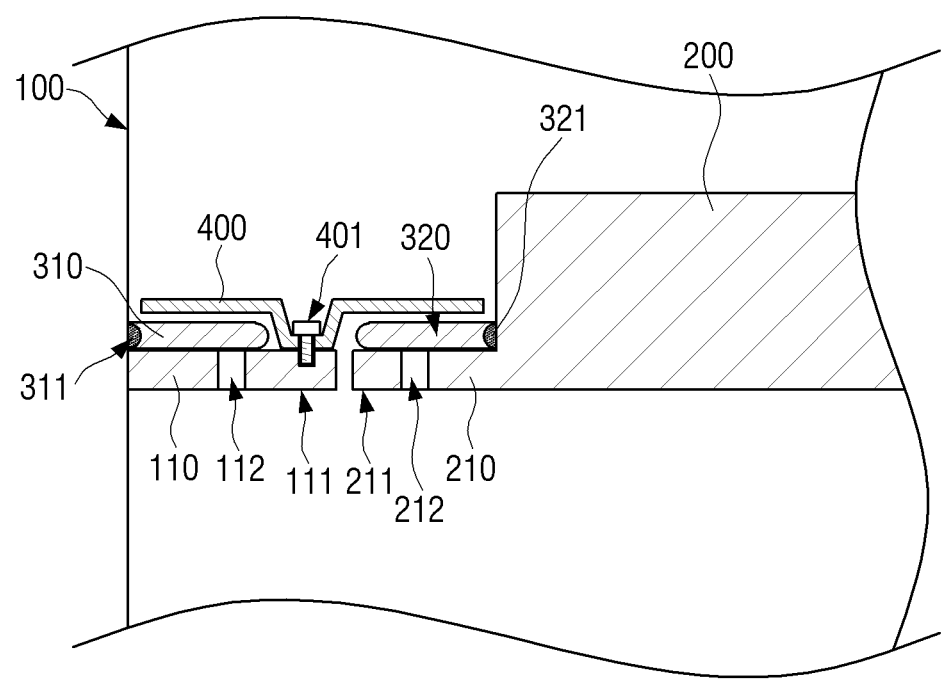
FIG. 8 is a partial cross-sectional view illustrating a configuration of an auxiliary frame according to an embodiment.

FIG. 8 is a partial cross-sectional view illustrating a configuration of an auxiliary frame 400 according to an embodiment.

Referring to FIG. 8, the filter 200 may include the side-surface member 210 which is disposed horizontally spaced apart with the support member 110. In addition, the air conditioning apparatus 1 may include an auxiliary frame 400 which is disposed vertically spaced apart with the support member 110 and the side-surface member 210.

The auxiliary frame 400 may be detachably fixed to the support member or the side-surface member through the fixing device 401. The fixing device 401 may be a bolt and a screw, but it not limited thereto.

Due to the support member 110, the side-surface member 210, and the auxiliary frame 400 being disposed as illustrated, the length of the gap between the case and the filter 200 may be lengthened, and because the form may become more complex, the air leakage may be more effectively prevented.

Based on the filter 200 being disposed at a terminal end on the air flow-path, the user may be subject to the inconvenience of having to disassemble all of the fan or other filters which are disposed more to the upstream side than the filter in order to change the filter 200.

However, based on the auxiliary frame 400 being disposed between the case 100 and the filter 200, the user may easily exchange the filter 200 to the downstream side (outside) by releasing the fixing of the auxiliary frame 400.

In addition, due to the auxiliary frame 400, the filter 200 may be more stably supported without being removed from the designated position despite the difference in pressure of the front-surface and the back-surface.

The sealing member 300 may include a first sealing member 310 which is disposed between the support member 110 and the auxiliary frame 400 and a second sealing member 320 which is disposed between the side-surface member 210 and the auxiliary frame 400.

The one-end 311 of the first sealing member 310 may be fixed to the side of the case 100, and the one-end 321 of the second sealing member 320 may be fixed to the side of the filter 200.

The support member 110 and the side-surface member 210 may be formed with grooves 112 and 212 which penetrate toward the thickness direction to the one-surfaces 111 and 211 of each of the support member 110 and the side-surface member 210. The pressure of the upstream side of the filter 200 may be transferred to each of the front-surface of the first sealing member 310 and the front-surface of the second sealing member 320 through the grooves 112 and 212 of the support member 110 and the side-surface member 210.

Accordingly, because the front surfaces of the first sealing member 310 and the second sealing member 320 receives a relatively higher pressure than the back-surfaces, the forms of the first sealing member 310 and the second sealing member 320 may be changed to a shape more closely in contact with the auxiliary frame 400.

Due to the changed forms of the first sealing member 310 and the second sealing member 320, because the gap between the case 100 and the filter 200 is narrowed or completely blocked, the air leaked through the gap between the case 100 and the filter 200 may be actively and effectively blocked.

Although not illustrated, the inside of the auxiliary frame 400 may be formed with a hole for the back-surface and the side-surface of the auxiliary frame 400 to be connected. The pressure of the downstream side of the filter 200 may be transferred to the back-surfaces of the first sealing member 310 and the second sealing member 320 through the hole of the above-described auxiliary frame 400 and the gap between the auxiliary frame 400 and the case 100 or the filter 200.

That is, because the difference in pressure received by the front and back-surfaces of the first sealing member 310 and the second sealing member 320 becomes greater, the forms of the first sealing member 310 and the second sealing member 320 may be changed to be more closely in contact with the auxiliary frame 400. Accordingly, the first sealing member 310 and the second sealing member 320 may more effectively block air leaking through the gap between the case 100 and the filter 200.

Figure 9:
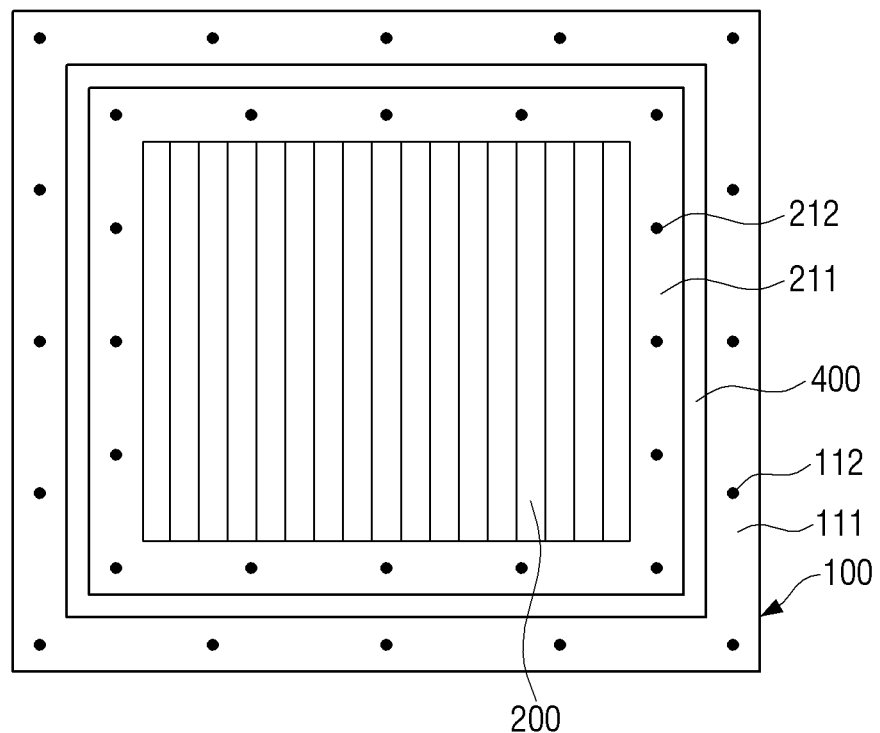
FIG. 9 is a front view of a configuration of FIG. 8 seen from an upstream side of an air flow direction.

FIG. 9 is a front view of a configuration of FIG. 8 seen from an upstream side of an air flow direction.

Referring to FIG. 9, the filter 200, the side-surface member 210, the auxiliary frame 400, and the support member 110 may be disposed in order from the center part of the air flow-path toward the outside.

The one-surface 111 of the support member 110 may be formed with a plurality of grooves 112 spaced apart at the predetermined interval, and the one-surface 211 of the side-surface member 210 may be formed with a plurality of grooves 112 spaced apart at a predetermined interval.

Accordingly, the pressure of the upstream side of the filter 200 may be uniformly transferred to the front-surfaces of the first sealing member 310 and the second sealing member 320.

Because the pressure of the upstream side of the filter 200 is equally transferred to the front-surfaces of the first sealing member 310 and the second sealing member 320 through the grooves 112 and 212 formed at the predetermined interval, the air may be prevented from leaking due to a gap opening in any localized region of the first sealing member 310 and the second sealing member 320.

The cross-sectional forms of the filter 200, the case 100 and the auxiliary frame 400 have been illustrated as a quadrangle, but the form may be circular, and there is no limitation to the form thereof.

While the disclosure has been illustrated and described with reference to various embodiments thereof, the disclosure is not limited to the specific embodiments described, and it will be understood by those skilled in the art that various changes in form and details may be made therein without departing from the spirit and scope of the disclosure.

What is claimed is:

1. An air conditioning apparatus, comprising:
   a case including an air inlet and a support member;
   a filter disposed inside the case and including a side-surface member formed along a side-surface of the filter;
   a sealing member covering a gap between the case and the filter; and
   a fan disposed inside the case to generate an air flow to suction air from outside the case through the air inlet to the filter;
   wherein the side-surface member is formed with at least one groove which transfers pressure from an upstream side of the filter to the sealing member while the fan generates the air flow.

2. The air conditioning apparatus of claim 1, wherein the filter is changeably mounted to the support member.

3. The air conditioning apparatus of claim 1, wherein an end of the sealing member is fixed to the filter or the case.

4. The air conditioning apparatus of claim 1, wherein the at least one groove is a plurality of grooves spaced apart at predetermined intervals.

5. The air conditioning apparatus of claim 1, wherein the filter is an ultra-low penetration air (ULPA) filter.

6. The air conditioning apparatus of claim 1, wherein
   the side-surface member is vertically spaced apart from the support member, and the sealing member is disposed between the support member and the side-surface member.

7. The air conditioning apparatus of claim 6, wherein
   the side-surface member is disposed upstream of the support member and an end of the sealing member is fixed to the filter.

8. The air conditioning apparatus of claim 6, wherein
   the side-surface member is disposed downstream to the support member, and an end of the sealing member is fixed to the case.

9. The air conditioning apparatus of claim 1, further comprising:
   an auxiliary frame vertically spaced apart from the support member and the side-surface member, wherein
   the side-surface member is horizontally spaced apart from the support member, and
   the sealing member includes at least one from among a first sealing member disposed between the support member and the auxiliary frame and a second sealing member disposed between the side-surface member and the auxiliary frame.

10. The air conditioning apparatus of claim 9, wherein an end of the first sealing member is fixed to the case and an end of the second sealing member is fixed to the filter.

11. The air conditioning apparatus of claim 9, wherein the auxiliary frame is attachable and detachable to and from the support member or the side-surface member.

* * * * *